United States Patent Office 3,222,376
Patented Dec. 7, 1965

3,222,376
DI-IMIDAZOLINES
Frederick Herman Siegele, Westport, Conn., assignor to American Cyanamid Company, New York, N.Y., a corporation of Maine
No Drawing. Filed Aug. 17, 1961, Ser. No. 131,988
6 Claims. (Cl. 260—309.6)

This invention relates to novel imidazolines and to methods for their preparation. More particularly, this invention relates to novel di-imidazolines, their methods of preparation, and to corrosion inhibitor compositions containing said imidazolines.

Heretofore, the corrosion of oil-producing and collecting equipment due to the action of corrosive fluids has been a serious drawback in the oil industry. Frequently, certain bacteria are present which accelerate the rate of corrosion. Attempts have been made to minimize or reduce corrosion of ferrous metal with varying degrees of success. For instance, where corrosion inhibitors, such as alkali metal hydroxides, aliphatic amines and heterocyclic nitrogen bases, exemplary of which are 2-alkyl-imidazolines, are employed in areas requiring large quantities of water in relation to the oil obtained, the cost of such corrosion inhibitors becomes prohibitive. The principal reason for this prohibition is that large quantities of inhibitors must be used to substantially minimize corrosion. Concentrations of the order of at least 10 parts per million and, more frequently, as much as 400 parts per million of an inhibitor based on the weight of the oil weel fluids are utilized for the purpose. Concentrations of less than 10 parts per million would be highly desirable from a practical and economical viewpoint. Nevertheless, many of the known corrosion inhibitors unfortunately cannot be used successfully at such low levels. Moreover, at such concentrations known corrosion inhibitors are found to be inactive as bacteriostatic agents.

Therefore, an object of the present invention is to provide novel corrosion inhibitor compounds having properties highly effective in minimizing corrosion of ferrous metal. It is a further object of the invention to provide corrosion inhibitors which are particularly effective in oil producing environments in which large amounts of saline water are present relative to the amount of oil produced. It is a still further object of the invention to provide bacteriostatic reagents when employed in low concentrations. Other objects and advantages will become apparent to those ordinarily skilled in the art from a consideration of the following detailed description.

To this end, amino di-imidazolines either as free bases or in the form of their mineral acid salts are provided as unique corrosion inhibitors of metal equipment when employed in amounts as low as three and one-half (3.5) parts per million. At such concentrations, these imidazolines are also found to be highly effective as bacteriostatic agents.

According to the instant invention, the novel di-imidazolines can be characterized by the following formula:

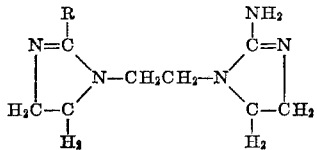

where R is an aliphatic radical and preferably containing from 4 to 22 carbon atoms such as, for instance, butyl, pentyl, hexyl, heptyl, nonyl, undecyl, lauryl, heptadecyl, heptadecenyl and heptadecadienyl. Also provided are mixtures of di-imidazolines derived particularly from tall oil fatty acids and comprising linoleic and oleic acids.

Di-imidazoline compounds defined above may be prepared by reacting substantially equimolar quantities of a cyanogen halide, such as for instance cyanogen chloride or cyanogen bromide, and an imidazoline represented by the structure:

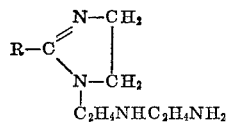

where R is the same as defined above. Advantageously, the aforementioned reaction is carried out at temperatures between about 0° C. and about 75° C., preferably between 20° C. and 60° C., for from about one to about ten hours, and thereafter recovering the desired di-imidazoline compound.

Among the imidazoline reactants contemplated may be mentioned the following:

(1) 2-heptadecyl-1-diethylenediaminoimidazoline,
(2) 2-heptadecenyl-1-diethylenediaminoimidazoline,
(3) 2-heptadecadienyl-1-diethylenediaminoimidazoline,
(4) 2-undecyl-1-diethylenediaminoimidazoline,
(5) 2-n-heptyl-1-diethylenediaminoimidazoline,
(6) 2-n-butyl-1-diethylenediaminoimidazoline,
(7) 2-nonyl-1-diethylenediaminoimidazoline,
(8) 2-lauryl-1-diethylenediaminoimidazoline,
(9) 2-tridecyl-1-diethylenediaminoimidazoline, homologs and isomers thereof. Mixtures of two or more of these reactants are within the purview of the invention. For instance, a mixture of 2-heptadecenyl-1-diethylenediaminoimidazoline and 2-heptadecadienyl-1-diethylenediaminoimidazoline, prepared from tall oil fatty acids and triethylene tetraamine can be preferably employed herein. Their preparation is well known. One method is described in United States patent, Reissue No. 23,227.

Di-imidazoline compounds of the invention are initially recovered as the hydrohalide salt and may, if desired, be neutralized by the addition of an alkaline compound, exemplary of the latter being alkali metal hydroxide and alkali metal carbonate. Finally, the so-formed product is extracted in a hydrocarbon solvent, as for example, pentane or hexane. Upon evaporation of the solvent, desired product is obtained.

The invention will be further described and illustrated by the following specific examples which are to be taken as merely illustrative and not limitative of the invention. Unless otherwise stated, all parts are by weight.

EXAMPLE 1

To a suitable reaction vessel, equipped with condenser, stirrer and thermometer, are added twenty parts of toluene to a mixture of 28 parts of an equal mixture of oleic and linoleic acids and 14.6 parts of triethylene tetramine. The solution is heated and water is removed as the toluene-water azeotrope while a portion of the toluene is recycled to the reactor. After eight hours, 5.4 parts of water have been collected. The remaining toluene is removed by distillation under vacuum. 31.4 parts of this reaction product are dissolved in dimethylformamide and introduced into a flask fitted with a thermometer, stirrer and gas inlet tube. During a thirty-minute period, 4.9 parts of cyanogen chloride gas are bubbled into the solution the temperature of which is maintained in the range of 25° C. to 35° C. The solution is then heated for an additional hour at 50° C. Following vacuum distillation to remove the dimethylformamide solvent, 35.5 parts of the desired mixed di-imidazoline hydrochloride comprising 2-amino-2'-heptadecenyl-1,1'-ethylenedi-2-imidazoline hydrochloride and 2-amino-2'-heptadecadienyl-1,1'-ethylenedi-2-imidazoline hydrochloride are obtained in substantially equal proportions having a softening point of 40° C.

The free base is thereafter obtained by dissolving the hydochloride salts in water, adding sodium hydroxide until a strongly alkaline solution is obtained, extracting the free base in pentane and vacuum-drying to recover the free base. The mixed di-imidazoline free base is a dark brown-red solid while the starting polyaminoimidazoline free base is a light yellow soft solid. The mixed di-imidazoline free base contains 11.5% N. The starting polyamineimidazoline free base contains 9% N. Further, infrared analysis indicates a large increase in absorption at a wavelength of 1675 reciprocal centimeters due to the formation of the additional imidazoline group.

EXAMPLE 2

The procedure of Example 1 is followed in every material detail except that the imidazoline reactant is replaced by 2-heptyl-1-diethylenediaminoimidazoline, prepared from triethylene tetramine and octanoic acid.

50.8 parts of the latter compound are dissolved in 100 parts of dimethylformamide solvent. 13.0 parts of cyanogen chloride are then bubbled into this solution at 50° C. over a two hour period. Resultant solution is heated for an additional hour at 60° C. and then subjected to vacuum distillation to remove the solvent. 62.5 parts of 2-amino-2'-heptyl-1,1'-ethylenedi-2-imidazoline hydrochloride, a dark brown-red solid is isolated having a softening point of 50° C. Infrared analysis indicates the presence of nitrile linkage in addition to an increase in absorption at a wavelength of 1675 reciprocal centimeters due to the presence of an additional imidazoline group.

EXAMPLE 3

Repeating the procedure of Example 1 in every material respect except that the imidazoline reactant is replaced by 2-undecyl-1-diethylenediaminoimidazoline prepared from lauric acid and triethylene tetramine. This compound is a white waxy crystalline solid.

Sixty-two parts of the latter compound are dissolved in 100 parts of dimethylformamide. Twelve parts of cyanogen chloride are bubbled into this solution at 35° C. over a period of about one hour. During this addition and subsequent heating at 60° C. for an additional one-half hour, the solution turns to a deep brownish-red color. After removal of the solvent, 73.5 parts of an analogous brown-red solid, 2-amino-2'-undecyl-1,1'-ethylenedi-2-imidazoline hydrochloride are isolated. The latter hydrochloride salt possesses a softening point of about 45° C. and, on infrared analysis, shows a large increase in absorption at a wavelength of 1675 reciprocal centimeters due to the additional imidazoline group formation.

Similar results are observed when cyanogen bromide is substituted for the cyanogen chloride reactant.

Di-imidazolines for the present invention processes utility as corrosion inhibitors as well as enhanced activity as fungicides, nematocides, insecticides, bactericides and algaecides in relatively dilute concentrations.

EXAMPLE 4

Corrosion inhibition is markedly increased utilizing the compounds of the present invention. In each of the following tests carried out in this example, a brine consisting of the following is employed:

(a) 90 parts of a brine mixture consisting of 10% sodium chloride and 0.5% calcium chloride, the remainder being water, and
(b) 10 parts of a mineral oil, and
(c) 1 part of a 6 percent acetic acid.

The latter brine solution is placed in a series of four-ounce Pyrex glass jars which are then saturated with hydrogen sulfide just prior to the determination for corrosion. Into each jar is placed a known amount of the corrosion inhibitor. Data relating to the concentration of each inhibitor as well as the degree of inhibition are tabulated below.

In operation, the corrosion detection system consists of a special soft steel probe which is sealed into a cap that fits each of the four-ounce jars. The exposed probe and a second coated reference probe, which are connected in series, are made part of a Wheatstone bridge circuit. The ratio of resistance of the exposed specimen to that of the covered specimen is determined with a corrosometer before and after the test period. The latter instrument reports the increase in relative resistance of each test probe exposed to the test fluid for twenty-four hours at 120° F. under fixed conditions of agitation. The change in relative resistance of each can be correlated with corrosion in microinches. The percent protection afforded by each corrosion inhibitor is calculated as follows:

$$\frac{L_1 - L_2}{L_1} \times 100$$

wherein $L_1$ is defined as the corrosion in microinches of the probe in an uninhibited test fluid known as the control, and $L_2$ is defined as the corrosion in microinches of the probe in the inhibited test fluid.

*Table I*

| Inhibitor | Percent Protection | | | | |
|---|---|---|---|---|---|
| | 2.5 p.p.m. | 3.75 p.p.m. | 5 p.p.m. | 10 p.p.m. | 25 p.p.m. |
| As prepared in Example 1 | 0 | 95 | | 100 | |
| As prepared in Example 2 | | | | 0 | 54 |
| As prepared in Example 3 | | | 0 | 95 | |

Bacteriostatic tests utilizing the compounds of the invention have shown that these compounds have marked effect on sulfate-reducing bacteria that are frequently present in oil production waters. The test employed is that procedure which is recommended by the American Petroleum Institute (recommended Procedure No. 38). It is found, for example, that the compounds of Examples 1 and 2 require about 3.1 parts per million for excellent bacteriostatic control, whereas the compound of Example 3 requires about 6.2 parts per million for the same control.

It is an important advantage of the present invention that the protective action of the di-imidazoline compounds can be observed at low concentrations. Such concentrations are in the order of 2.5 parts per million to 25.0 parts per million, and such quantities are hereinafter referred to as corrosion-inhibiting quantities. Of course, larger quantities than these may be used, but they do not appear to enhance the desired corrosion-inhibiting effects.

I claim:

1. A composition of matter selected from the group consisting of a di-imidazoline, a di-imidazoline mixture and hydrohalides thereof, said di-imidazoline having the structure:

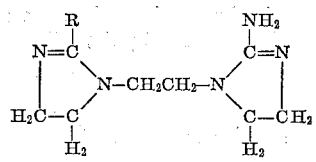

where R is an unsubstituted hydrocarbon from 4 to 22 carbon atoms selected from the group consisting of alkyl, alkenyl and alkadienyl.

2. The compound: 2-amino-2'-undecyl-1,1'-ethylenedi-2-imidazoline.

3. The compound: 2-amino-2'-heptyl-1,1'-ethylenedi-2-imidazoline.

4. The bis-imidazoline mixture: 2-amino-2'-heptadecenyl-1,1'-ethylenedi-2-imidazoline and 2-amino-2'-heptadecadienyl-1,1'-ethylenedi-2-imidazoline present in substantially equal proportions.

5. The hydrohalide salts of the mixture of claim 4.

6. The hydrohalide of 2-amino-2'-undecyl-1,1'-ethylenedi-2-imidazoline.

References Cited by the Examiner

UNITED STATES PATENTS

| | | | |
|---|---|---|---|
| 2,846,440 | 8/1958 | Hughes | 260—309.6 |
| 2,950,246 | 8/1960 | Hughes et al. | 252—8.55 |
| 2,957,003 | 10/1960 | Johnson | 260—309.6 |
| 2,967,868 | 6/1961 | Smith | 260—309.6 |
| 3,008,898 | 11/1961 | Hughes | 260—309.6 |
| 3,014,864 | 12/1961 | Hughes et al. | 252—8.55 |

OTHER REFERENCES

Brüning: German Patentanmeldung F 14,175, Nov. 29, 1956.

Brüning: German application 1,029,828, printed May 14, 1958.

Marxer: Jour. Amer. Chem. Soc., vol. 79, pages 467–72 (1957).

WALTER A. MODANCE, *Primary Examiner.*

DUVAL T. McCUTCHEN, NICHOLAS S. RIZZIO, NATLIE TROUSOF, *Assistant Examiners.*